US012508817B2

(12) United States Patent
Morales

(10) Patent No.: US 12,508,817 B2
(45) Date of Patent: Dec. 30, 2025

(54) PRINTING DEVICE INLINE INSPECTION SYSTEM AND METHODS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 337 days.

(21) Appl. No.: 18/231,570

(22) Filed: Aug. 8, 2023

(65) Prior Publication Data

US 2025/0050656 A1 Feb. 13, 2025

(51) Int. Cl.

*B41J 2/005* (2006.01)
*B41J 2/21* (2006.01)
*B41J 29/46* (2006.01)

(52) U.S. Cl.

CPC ............ *B41J 2/2146* (2013.01); *B41J 29/46* (2013.01)

(58) Field of Classification Search

CPC ................................ B41J 2/2146; B41J 29/46
See application file for complete search history.

(56) References Cited

U.S. PATENT DOCUMENTS

2017/0177962 A1* 6/2017 Yamazaki .............. G06V 10/50
2018/0207937 A1* 7/2018 Sugaya .................. B41J 29/393

* cited by examiner

*Primary Examiner* — Ibrahim Siddo
(74) *Attorney, Agent, or Firm* — Millen, White, Zelano & Branigan P.C.; William F. Nixon

(57) ABSTRACT

A printing device includes an inline inspection system using one or more sensors to determine defects on a printed sheet. The control unit, or other component connected to the printing device, determines a plurality of horizontal and vertical portions within one or more images on the sheet that are above a colorant value, or CMYK, threshold. A set of the plurality of horizontal and vertical portions are identified from the images on the sheet. The set of horizontal portions may differ from the set of vertical portions. The printed images of these portions are captured by the inline sensor. The captured data is analyzed to determine a defect within the printed sheet.

20 Claims, 7 Drawing Sheets

PRINTING DEVICE INLINE INSPECTION SYSTEM AND METHODS

FIELD OF THE INVENTION

The present invention relates to a printing device having an optimized defect inspection system and methods to detect defects in a sheet, or an image on a sheet.

DESCRIPTION OF THE RELATED ART

Printing inspection systems on printing devices may include simple systems or more complex systems. Simple systems may use an inline contact image sensor (CIS) to detect a limited number of defects. For example, some devices use an inline sensor to detect inkjet jet outs or dogeared sheets. Other printing devices use an inline sensor to detect the position, shape, and size of a sheet. Other printing devices may detect prepunched paper holes in order to ensure that no ink is jetted into the paper hole.

Other systems may capture an image of the entire document. These systems may perform sophisticated image analysis that is used to perform advanced inspection such as brand color reproduction verification for specific page objects and content verification for regulatory compliance verification. These systems also may detect print reproduction defects beyond lines in the process direction.

Although systems that use inline CIS are limited, they are inexpensive. They provide a reasonable inline inspection option for many print shops. These systems are limited in scope as they can only detect print reproduction defects, yet given their price points, this feature is acceptable. The problem with these systems is that they cannot offer a complete print reproduction solution as they do not have the ability to detect cross process defects. In addition, these systems offer limited functionality for process defects because at their price point, they cannot use high performance hardware that may be able to detect additional print reproduction defects.

By contrast, more complex systems, such as vision systems, can address all of the shortfalls of an inline CIS system. These systems, however, typically are very expensive as they use high performance hardware to evaluate entire document pages. Further, vendors offer a broad range of inspection capabilities, such as 100% inspection, well beyond print reproduction defect detection in order to provide value that is commensurate with the cost of the inspection hardware.

SUMMARY OF THE INVENTION

A method for performing an inline inspection during printing operations is disclosed. The method includes receiving a printed sheet of paper media within a printing device. The method also includes determining a plurality of horizontal portions above a colorant value threshold on the printed sheet. The horizontal portions extend in a horizontal direction across the printed sheet. The method also includes identifying a set of the plurality of horizontal portions. The set of horizontal portions span a width of the printed sheet. The method also includes analyzing the set of horizontal portions to detect a defect within the printed sheet.

An inspection system for a printing device is disclosed. The inspection system is configured to receive a printed sheet of a paper media within a printing device. The inspection system also is configured to determine a plurality of horizontal portions above a colorant value threshold on the printed sheet. The horizontal portions extend in a horizontal direction across the printed sheet. The inspection system also is configured to identify a set of the plurality of horizontal portions. The set of horizontal portions span a width of the printed sheet. The inspection system also is configured to determine a plurality of vertical portions above the colorant value threshold on the printed sheet. The vertical portions extend in a vertical direction across the printed sheet. The inspection system also is configured to identify a set of the plurality of vertical portions. The set of vertical portions span a length of the printed sheet. The inspection system also is configured to analyze the set of horizontal portions and the set of vertical portions to detect a defect within the printed sheet.

A method for performing an inline inspection during printing operations is disclosed. The method includes receiving a printed sheet of paper media within a printing device. The method also includes determining a plurality of vertical portions above a colorant value threshold on the printed sheet. The vertical portions extend in a vertical direction across the printed sheet. The method also includes identifying a set of the plurality of vertical portions. The set of vertical portions span a length of the printed sheet. The method also includes analyzing the set of vertical portions to detect a defect within the printed sheet.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1:
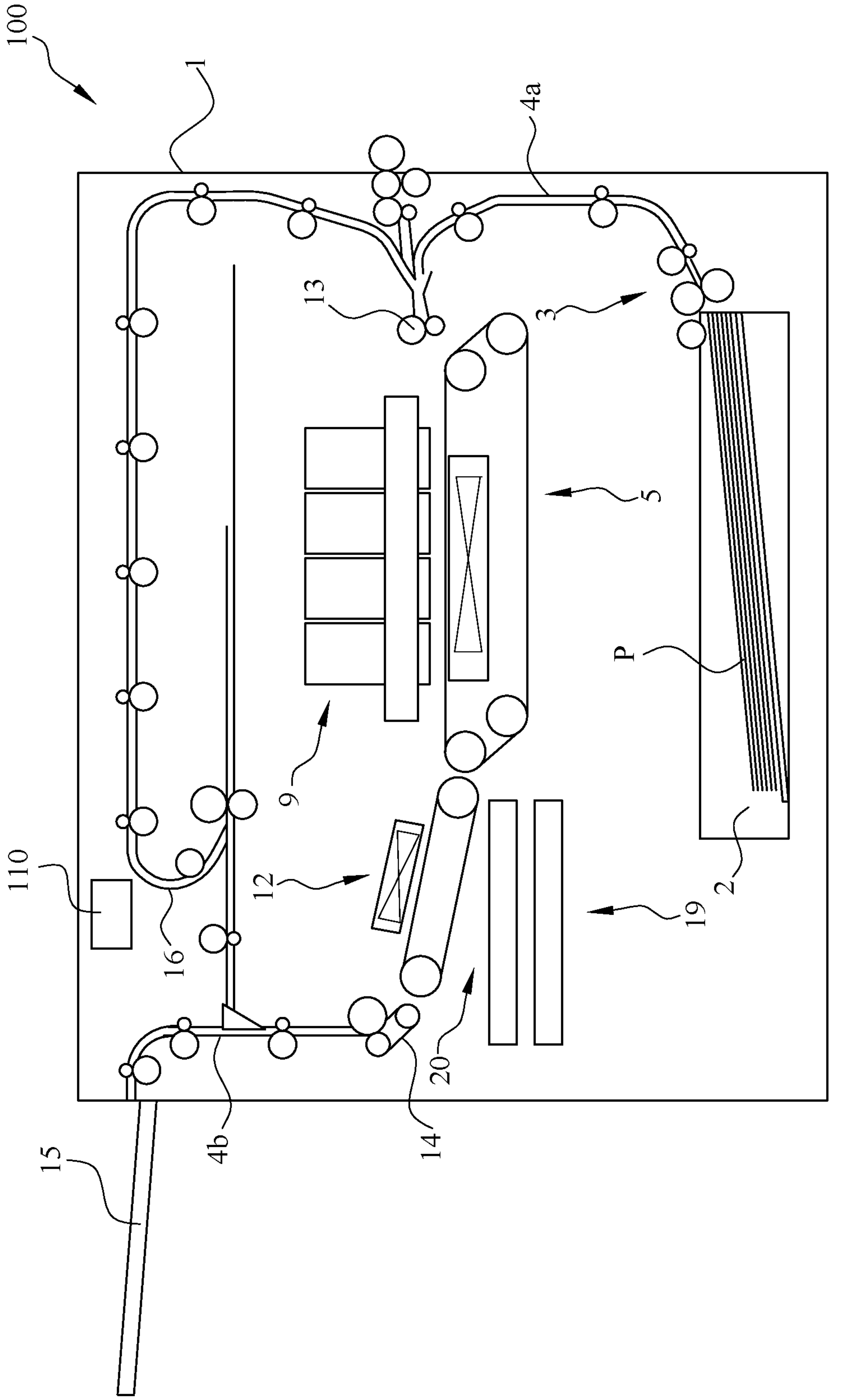
FIG. 1 illustrates a schematic diagram of a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an optimized inline inspection system that provides process and cross process print reproduction detect inspection without requiring the expensive hardware used by vision systems. Alternatively, the disclosed embodiments may be used to enable inline process print defect inspection using much cheaper hardware versus typical inline systems, which ideally would use hardware powerful enough to detect defects before sheets reach their final destination. This ability may be a tall order on printing devices that usually print 150 A4 sheets per minute.

The inspection system would work in the following manner. During rendering, the inspection system will generate a set of "master" strips that will be used for process and cross process defect detection. The inspection system will find portions of the image that have colorant values above a certain threshold. This feature may be done using an algorithm. The inspection system then will identify the areas from above which can be used to span the width of the image. The inspection system may determine that these areas have sufficient cyan, magenta, yellow, and black (CMYK) colorant to be used for defect detection in the process direction.

The inspection system then may perform the same operation spanning the height of the image. These areas will be stored for each page and passed to the inspection system. There would be no changes to the inline CIS in most process defect detection systems. The system scans all pages that pass under the sensor(s) much in the same manner as currently done. Instead of capturing the entire page, however, the CIS would only retain the pixel data for the stored areas.

For example, the horizontal areas identified above from the page would be stored. The horizontal areas cover the entire cross process width of the document and contains content that is more likely to show print defects. The vertical content would be similarly stored. The defect detection would not change but, instead of processing entire page images, the disclosed embodiments would process much smaller images. This feature allows the use of much cheaper hardware.

In addition, the defect detection would receive images for both process and cross process contact that would enable cross process defect detection using hardware that is cheaper versus process detection hardware. This feature would enable more comprehensive defect detection versus the typical system while at the same time enabling that detection to happen at much higher speeds using lower cost hardware.

FIG. 1 depicts a schematic diagram of a printing device 100 for printing documents according to the disclosed embodiments. Printing device 100 includes a paper feed cassette 2 that is a paper storage unit. Paper feed cassette 2 may be arranged at the lower inner portion of printing device body 1. Paper P, which is an example of a recording medium, is housed inside paper feed cassette 2.

A paper feeding device 3 is arranged on the downstream side in the paper conveying direction of paper feed cassette 2, or, in other words, above the right side of paper feed cassette in FIG. 1. By this paper feeding device 3, paper P is directed toward the upper right of paper feed cassette 2 in FIG. 1, and is separated and fed out one sheet at a time.

Printing device 100 includes a first paper conveying path 4*a* in the inner portion thereof. First paper conveying path 4*a* is located on the upper right side, which is the paper feed direction, with respect to paper feed cassette 2. The paper P fed out from paper feed cassette 2 is conveyed vertically upward along the side surface of printing device body 1 by first paper conveying path 4*a*.

A registration roller pair 13 is provided at the downstream end of first paper conveying path 4*a* in the paper conveying direction. Further, a first conveying unit 5 and a recording unit 9 are arranged immediately downstream of registration roller pair 13 in the paper conveying direction. The paper P fed out from paper feed cassette 2 reaches registration roller pair 13 via first paper conveying path 4*a*. Registration roller pair 13 feeds the paper P toward first conveying unit 5 while correcting diagonal feeding of the paper P and measuring the timing with the ink ejection operation performed by recording unit 9.

The paper P fed to first conveying unit 5 is conveyed to a position facing recording unit 9, especially recording heads 17*a*, 17*b*, and 17*c*, disclosed below, by a first conveyor belt 8, shown in FIG. 2. An image is recorded on the paper P by ejecting ink from recording unit 9 onto the paper P. At this time, the ejection of ink in recording unit 9 is controlled by control unit 110 in the inner portion of printing device 100. Control unit 110 includes, for example, a central processing unit (CPU). Control unit 110 also may be known as a digital front end (DFE) for printing device 100.

Second conveying unit 12 is arranged on the downstream side, or left side in FIG. 1, of first conveying unit 5 in the paper conveying direction. The paper P on which the image is recorded by recording unit 9 is sent to second conveying unit 12. The ink ejected onto the surface of the paper P is dried while passing through second conveying unit 12.

A decurler unit 14 is provided on the downstream side of second conveying unit 12 in the paper conveying direction and near the left side surface of printing device body 1. The paper P whose ink has been dried by second conveying unit 12 is sent to decurler unit 14 in order to correct curling that has occurred in the paper P.

A second paper conveying path 4*b* is provided on the downstream side, or upper side in FIG. 1, of decurler unit 14 in the paper conveying direction. In a case where double-sided recording is not performed, the paper P that has passed through decurler unit 14 passes through second paper conveying path 4*b* and is discharged to paper discharge tray 15 provided in the outer portion of the left side surface of printing device 100.

A reverse conveying path 16 for performing double-sided recording is provided in the upper portion of printing device body 1 above recording unit 9 and second conveying unit 12. In a case of performing double-sided recording, the paper P that has passed through second conveying unit 12 and decurler unit 14 after recording on one surface, or the first surface, of the paper P is sent to reverse conveying path 16 through second paper conveying path 4*b*.

The conveying direction of the paper P sent to reverse conveying path 16 is subsequently switched for recording on the other surface, or the second surface, of the paper P. Then, the paper P passes through the upper portion of printing device body 1 and is sent toward the right side, and is sent again, via registration roller pair 13, to first conveying unit 5 with the second surface thereof facing upward. In first conveying unit 5, the paper P is conveyed to a position facing recording unit 9, and an image is recorded on the second surface by ejecting ink from recording unit 9. The paper P, after double-sided recording, is discharged to paper discharge tray 15 via second conveying unit 12, decurler unit 14, and second paper conveying path 4*b*, in this order.

Moreover, a maintenance unit 19 and a cap unit 20 are arranged below second conveying unit 12. When executing purging, maintenance unit 19 moves horizontally below recording unit 9, wipes the ink extruded from the ink ejection port of the recording head, and collects the wiped ink. Note that purging refers to an operation of forcibly extruding the ink from the ink ejection port of the recording head in order to discharge thickened ink, foreign matter, and air bubbles in the ink ejection port. Cap unit 20 moves horizontally below recording unit 9 when capping the ink ejection surface of the recording head, moves further upward, and is attached to the lower surface of the recording head.

Figure 2:
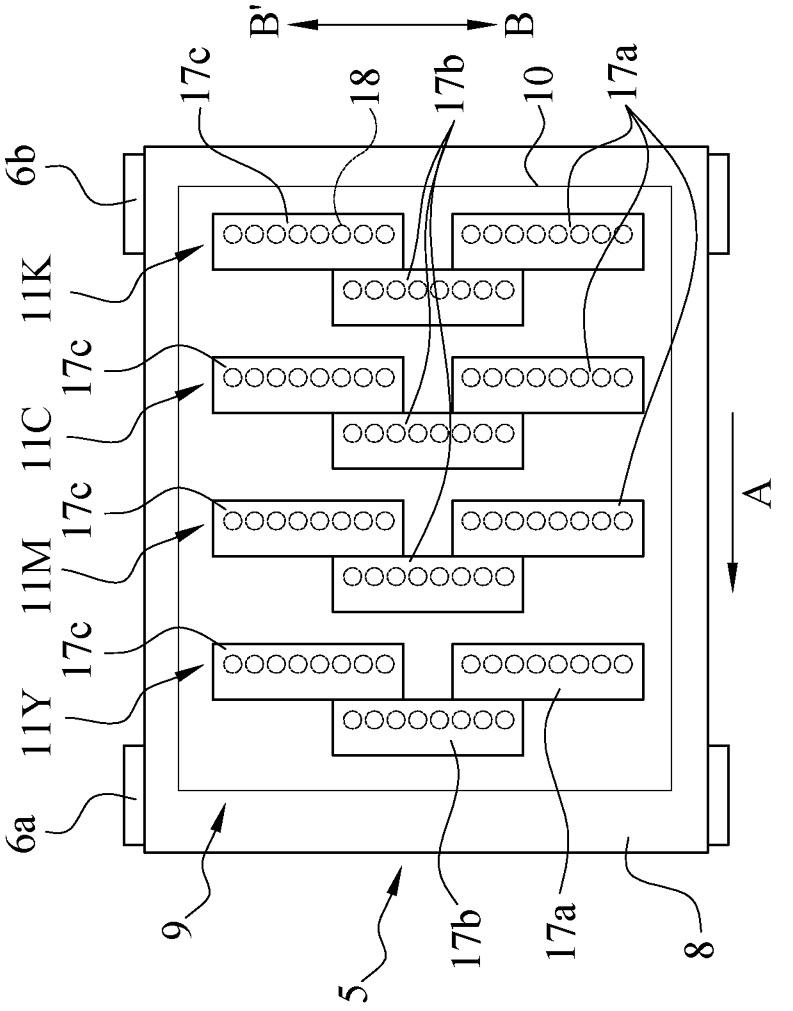
FIG. 2 illustrates a plan view of a recording unit according to the disclosed embodiments.

FIG. 2 depicts a plan view of recording unit 9 according to the disclosed embodiments. Recording unit 9 includes a head housing 10 and line heads 11Y, 11M, 11C, and 11K. Line heads 11Y to 11K are held in head housing 10 at a height at which specific spacing, for example 1 mm, is formed with respect to the conveying surface of an endless first conveyor belt 8 that spans around a plurality of rollers including a drive roller 6*a*, a follower roller 6*b*, and another roller 7.

Line heads 11Y to 11K have a plurality of recording heads 17*a*, 17*b*, and 17*c*, respectively. Recording heads 17*a* to 17*c* are arranged in a zigzag pattern along the paper width direction (direction of arrow BB') orthogonal to the paper conveying direction (direction of arrow A). Recording heads 17*a* to 17*c* have a plurality of ink ejection ports 18 (nozzles). Each ink ejection ports 18 are arranged side by side at equal intervals in the width direction of the recording head, or in other words, the paper width direction (direction of arrow BB'). From line heads 11Y to 11K, ink of each color of yellow (Y), magenta (M), cyan (C), and black (K) is respectively ejected via ink ejection ports 18 of recording heads 17*a* to 17*c* toward the paper P that is conveyed by first conveyor belt 8.

Figure 3:
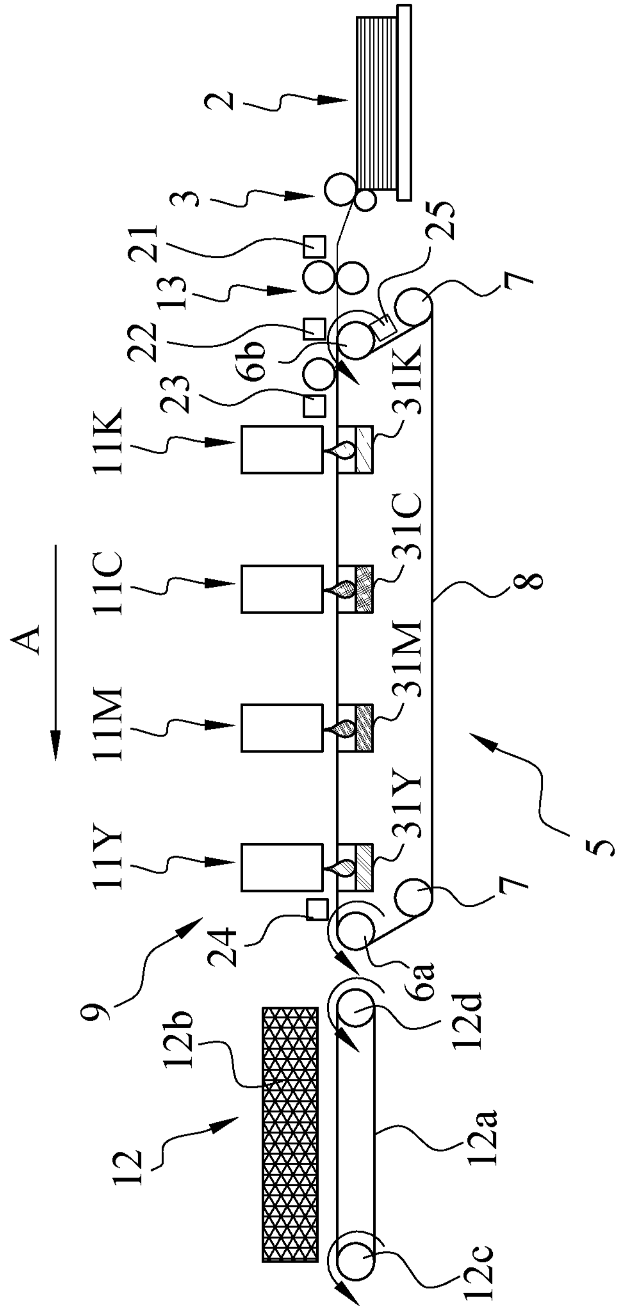
FIG. 3 illustrates a configuration around the conveying path of the paper from a paper feed cassette to a second conveying unit via a first conveying unit according to the disclosed embodiments.
Figure 4:
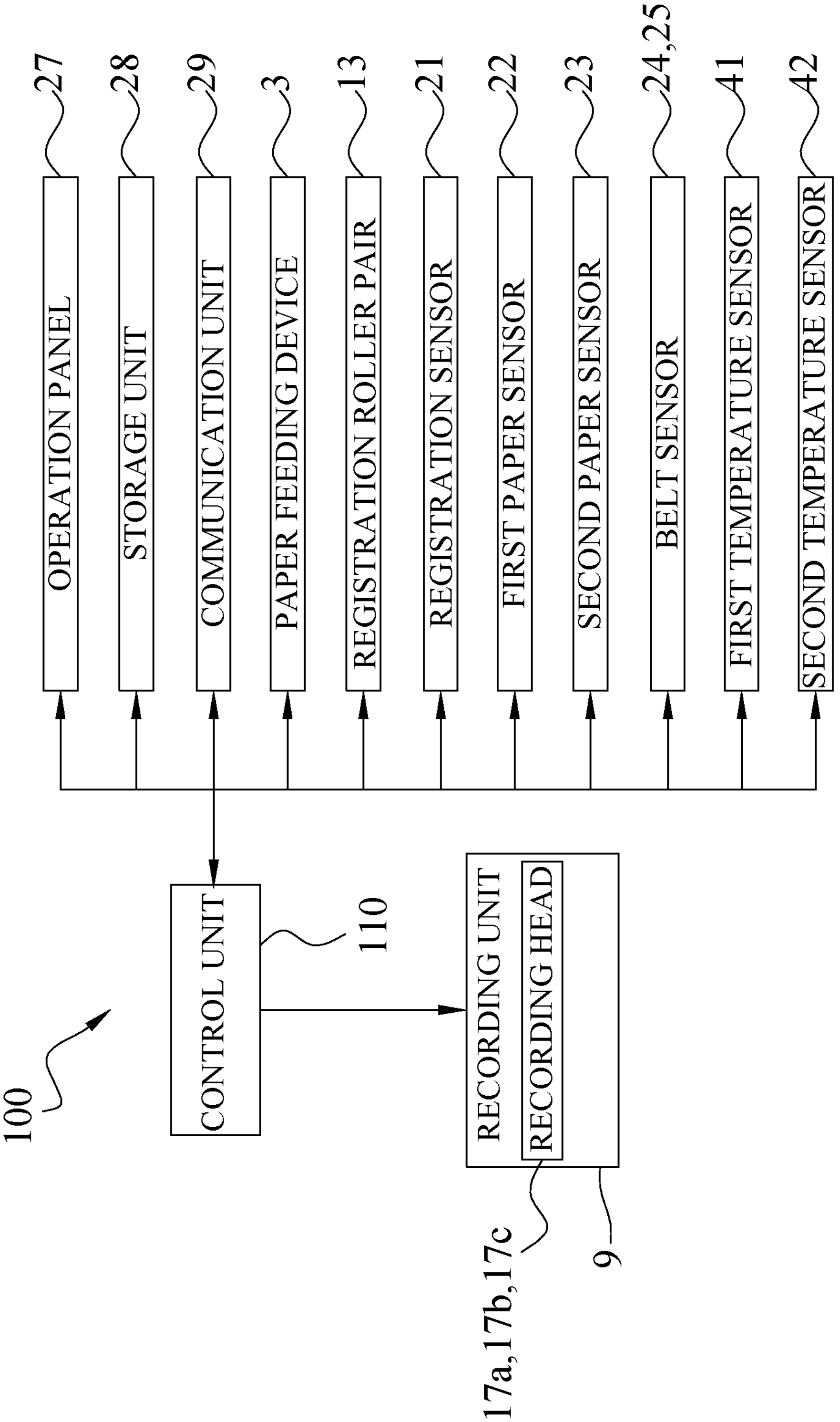
FIG. 4 illustrates a block diagram showing a hardware configuration of a main part of the printing device according to the disclosed embodiments.

FIG. 3 depicts a configuration around the conveying path of the paper P from paper feed cassette 2 to second conveying unit 12 via first conveying unit 5 according to the disclosed embodiments. FIG. 4 depicts a block diagram showing a hardware configuration of a main part of printing device 100 according to the disclosed embodiments. Printing device 100, in addition to the configuration disclosed above, further includes a registration sensor 21, a first paper sensor 22, a second paper sensor 23, belt sensors 24 and 25, first temperature sensor 41, and second temperature sensor 42.

Registration sensor 21 detects the paper P conveyed from paper feed cassette 2 by paper feeding device 3 and sent to registration roller pair 13. Control unit 110 is able to control the rotation start timing of registration roller pair 13 based on the detection result of registration sensor 21. For example, control unit 110 is able to control the supply timing of paper P after the skew (inclination) correction by registration roller pair 13 to first conveyor belt 8 based on the detection result of registration sensor 21.

First paper sensor 22 is a line sensor that detects the position in the width direction of the paper P sent from registration roller pair 13 to first conveyor belt 8. Based on the detection result of first paper sensor 22, control unit 110 is able to record an image on the paper P by causing ink to be ejected from ink ejection openings 18 of the ink ejection ports of recording heads 17*a* to 17*c* of line heads 11Y to 11K that correspond to the width of the paper P.

Second paper sensor 23 is a sensor for detecting the position in the conveying direction of the paper P conveyed by first conveyor belt 8. Second paper sensor 23 is located on the upstream side in the paper conveying direction of recording unit 9 and on the downstream side of first paper sensor 22. Based on the detection result of second paper sensor 23, control unit 110 is able to control the ink ejection timing for the paper P reaching the position facing line heads 11*y* to 11K, and recording heads 17*a* to 17*c*, by first conveyor belt 8.

Belt sensors 24 and 25 detect the positions of a plurality of opening portion groups provided on first conveyor belt 8. Belt sensors 24 and 25 are detection sensors that detect the passage of at least one of the opening groups due to the running of first conveyor belt 8. Belt sensor 24 is located on the downstream side of recording unit 9 in the paper conveying direction, or the running direction of first conveyor belt 8. Belt sensor 25 is located at a position between follower roller 6*b* and other roller 7 where first conveyor belt 8 is stretched around follower roller 6*b* and other roller 7. Follower roller 6*b* is located on the upstream side of recording unit 9 in the running direction of first conveyor belt 8. Note that belt sensor 24 also has the same function as second paper sensor 23. Control unit 110 is able to control registration roller pair 13 so as to supply paper P to first conveyor belt 8 at a specific timing based on the detection result of belt sensor 24 or 25.

The positions of the paper P are detected by a plurality of sensors (second paper sensor 23 and belt sensor 24), and the positions of the opening portion groups of first conveyor belt 8 are detected by a plurality of sensors (belt sensors 24 and 25), and, as a result, it is possible to correct errors in the detected positions and detect an abnormality.

First paper sensor 22, second paper sensor 23, and belt sensors 24 and 25 disclosed above may be configured by a CIS sensor. Marks corresponding to the position of opening portion groups are formed at the end portion in the width direction of first conveyor belt 8 and belt sensors 24 and 25 detect the marks, whereby the positions of the opening portion groups may be detected. CIS sensors may be image sensors that are almost in direct contact with the object to be scanned. A CIS sensor typically includes a linear array of detectors, covered by focusing lenses and flanked by red, green, and blue light emitting diodes (LEDs) for illumination.

First temperature sensor 41 is a sensor that detects the ambient temperature of printing device 100, and includes, for example, a non-contact temperature sensor such as a radiation thermometer or the like, and is provided on the outer surface of printing device main body 1. Second temperature sensor 42 is a sensor that detects the temperature of recording heads 17*a* to 17*c*, and includes, for example, a contact type temperature sensor such as a thermistor, a resistance temperature detector, a thermocouple, and the like. Control unit 110 can control the amount of ink ejected from each ink ejection port 18 of recording heads 17*a* to 17*c* based on the detection result of first temperature sensor 41 or second temperature sensor 42.

Printing device 100 includes an operation panel 27, a storage unit 28, and a communication unit 29. Operation panel 27 is an operation unit for receiving various setting inputs from an operator. For example, the operator may operate operation panel 27 to input information about the size of the paper P set in paper feed cassette 2, or, in other words, the size of the paper P conveyed by first conveyor belt 8. Storage unit 28 is a memory that stores an operation program of control unit 110 and also stores various types of information, and includes a Read Only Memory (ROM), a Random Access Memory (RAM), a non-volatile memory, and the like. Information sent by operation panel 27 is stored in storage unit 28. Communication unit 29 is a communication interface, such as a personal computer for transmitting and receiving information to and from printing device 100. For example, when the operator operates communication unit 29 and transmits a print command together with image data to printing device 100, the image data and the print command are inputted to printing device 100 via communication unit 29. In printing device 100, an image may be recorded on the paper P by control unit 110 controlling recording heads 17*a* to 17*c* to eject ink based on the image data. Image data also may be stored temporarily in storage unit 28.

Referring to FIG. 3, printing device 100 has ink receiving units 31Y, 31M, 31C, and 31K on the inner peripheral surface side of first conveyor belt 8. When recording heads 17*a* to 17*c* are made to execute flushing, ink receiving units 31Y to 31K receive and collect the ink that has been ejected from recording heads 17*a* to 17*c* and passed through the opening portions of opening portion groups of first conveyor belt 8. Ink receiving units 31Y to 31K are provided at positions facing recording heads 17*a* to 17*c* of line heads 11Y to 11K via first conveyor belt 8. The ink collected by ink receiving units 31Y to 31K is sent to, for example, a waste ink tank and disposed of, however, also may be reused without being disposed of.

Flushing is the ejection of the ink at a timing different from the timing that contributes to image formation or recording on the paper P, and is for the purpose of reducing or preventing clogging of ink ejection ports 18 due to ink drying. The execution of flushing in the recording heads 17*a* to 17*c* is controlled by control unit 110. Second conveying unit 12 is configured to include a second conveyor belt 12*a* and a dryer 12*b*. Second conveyor belt 12*a* is stretched around two drive rollers 12*c* and a follower roller 12*d*. The paper P that is conveyed by first conveying unit 5 and on which an image has been recorded by ink ejected by recording unit 9 is conveyed by second conveyor belt 12*a* and dried by dryer 12*b* while being conveyed to decurler unit 14.

Figure 5:
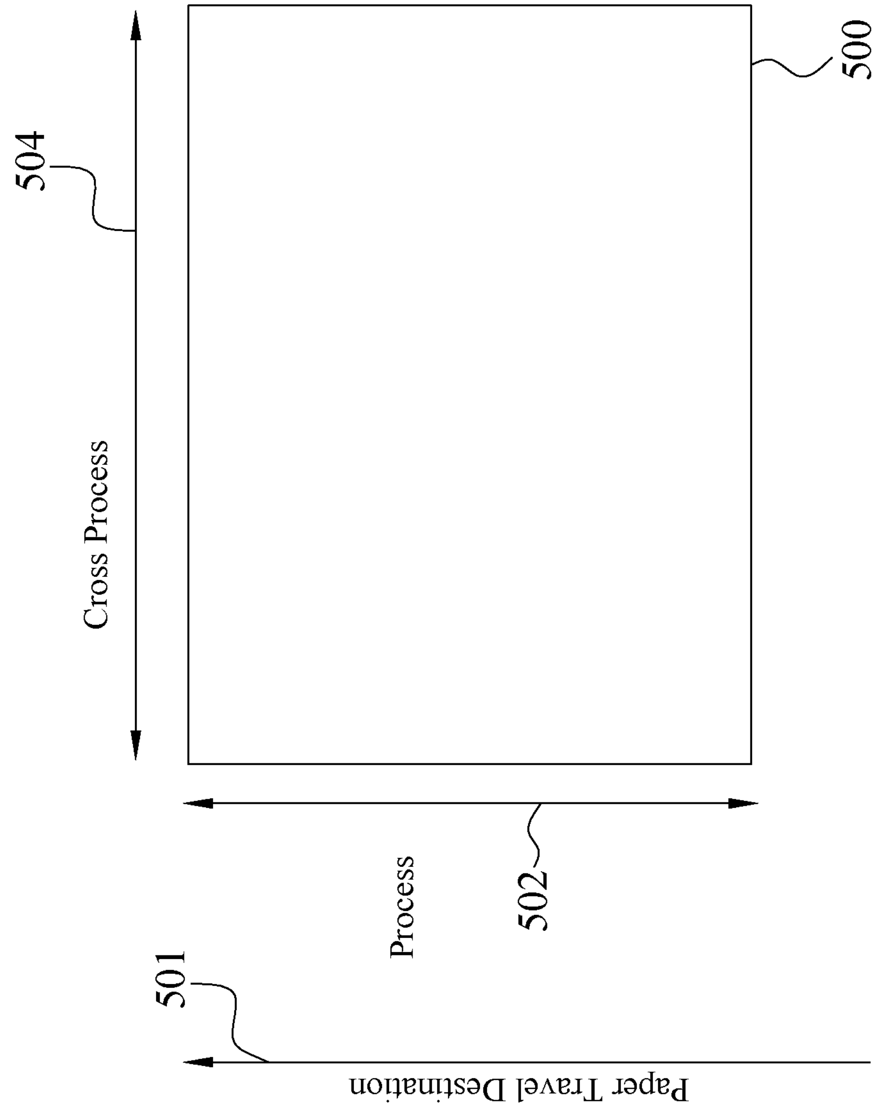
FIG. 5 illustrates a sheet with applicable process and cross process directions according to the disclosed embodiments.

FIG. 5 depicts a sheet 500 with applicable process and cross process directions according to the disclosed embodiments. Process direction 502 and cross process direction 504 are defined according to paper travel direction 501. Paper travel direction 501 may refer to how sheet 500 moves first conveying path 4*a* and second conveying path 4*b* within printing device 100. As sheet 500 is analyzed by first paper sensor 22, its position is detected in the width direction.

In addition to determining the position of sheet 500, registration sensor 21, first paper sensor 22, second paper sensor 23, and belt sensors 24 and 25 are able to detect defects in sheet 500. As these sensors are able to capture an image of sheet 500, this image may be used to detect defects according to the disclosed embodiments without the need for high performance hardware. The disclosed embodiments include checking for defects in process direction 502, that is the direction corresponding to paper travel direction 501. In other words, process direction 502 may relate to the length of sheet 500 as it moves within printing device 100. The disclosed embodiments also include checking for defects in cross process direction 504, which is not the direction corresponding to paper travel direction 501. In other words, cross process direction 504 may relate to the width of sheet 500 as it moves within printing device 100.

Figure 6:
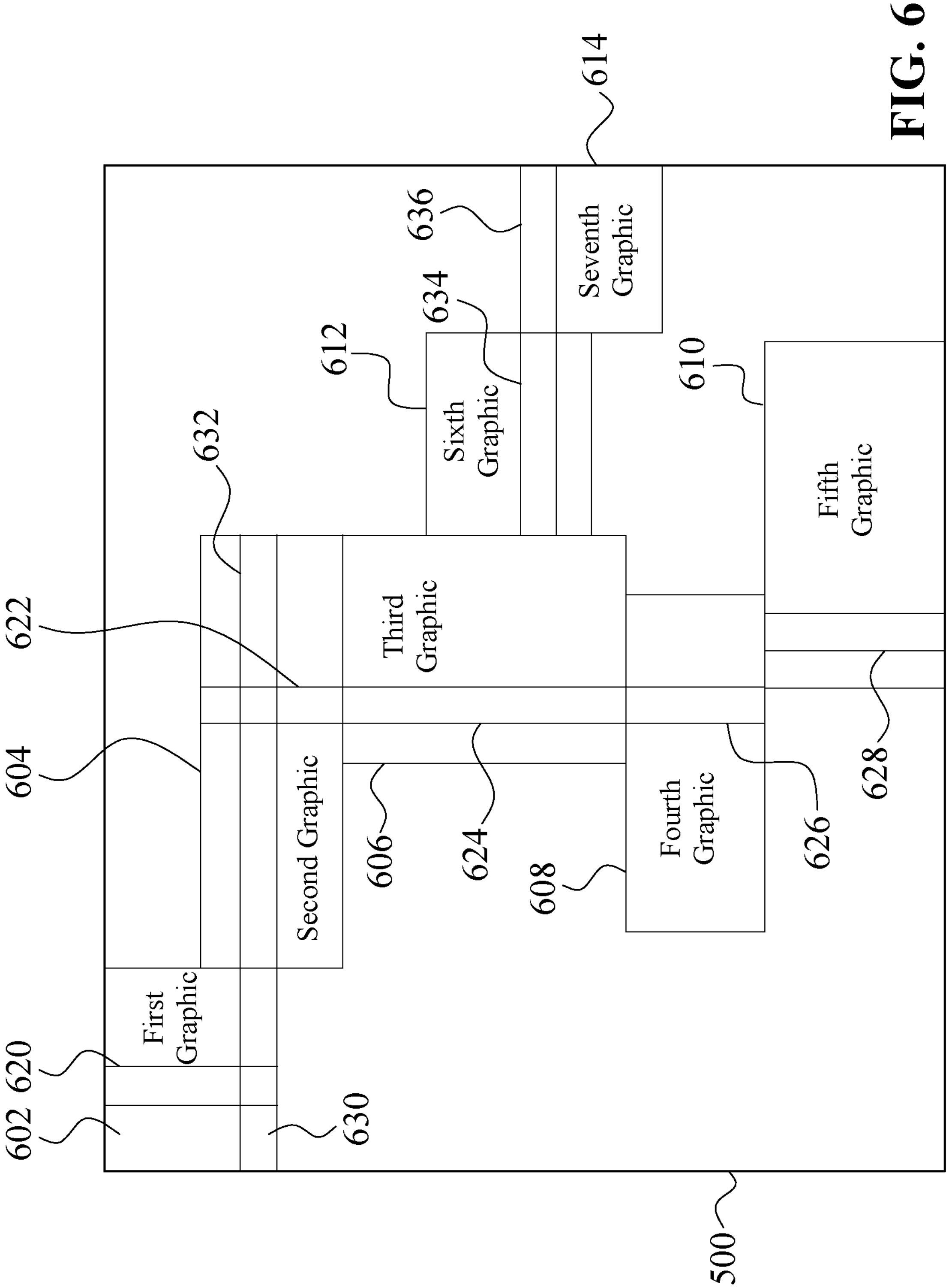
FIG. 6 illustrates a sheet with graphics used in detecting defects according to the disclosed embodiments.

FIG. 6 depicts sheet 500 with graphics used in detecting defects according to the disclosed embodiments. Sheet 500 is shown in greater detail. Sheet 500 includes graphics that require the use of ink, preferably CMYK inks applied to the sheet, from line heads 11Y to 11K, as disclosed above. Sheet 500 may include text or other items that are not graphics, but these are not shown. During rendering of sheet 500, the disclosed embodiments will generate a set of "master" strips that will be used for process and cross process defect detection.

Sheet 500 includes first graphic 602, second graphic 604, third graphic 606, fourth graphic 608, fifth graphic 610, sixth graphic 612, and seventh graphic 614. Graphics 602-614 may be portions of a large image or graphic on sheet 500. Alternatively, they may be different images positioned on sheet 500. Some graphics may be combined into a single image while others are stand-alone images. For example, second graphic 604 and third graphic 606 may be a single image while the other graphics are separate images. The disclosed embodiments identify graphics 602-614 on sheet 500 for defect detection.

The disclosed embodiments, such as using control unit 110, will find portions of the graphics, or images, that have colorant values above a certain threshold. Control unit 110, or another component within or connected to printing device 100, will determine portions of sheet 500 that are graphics 602-614. The threshold indicates that enough colorant is placed on sheet 500 at the identified location to provide an adequate defect detection for that portion of the image or images. This threshold relates to the amount of ink on that portion of sheet 500. An algorithm may be used to determine where one or more graphics for images are positioned on sheet 500.

For example, the disclosed embodiments may use a "blob" detection algorithm. A blob may be defined as a group of connected pixels in an image that share some common property, such as a grayscale value. Using the above example, dark connected regions on sheet 500 may be blobs. The disclosed embodiments detect blobs that comprise graphics 602-614.

The detection algorithm may use thresholding that converts the source image or images into several binary images by thresholding the source image with thresholds that may be incremented until a max threshold is reached. The disclosed embodiments may use global thresholding which means that the thresholding rule is applied equally to every pixel in an image and the threshold value is fixed. The algorithm may take a source image (src) and a threshold value (thresh) as input, and produce an output image (dst) by comparing the pixel intensity at source pixel location (x,y) on sheet 500 to the threshold. If src (x,y) is greater than or equal to threshold value (thresh) then dst (x,y) is assigned some value. Otherwise, dst (x,y) is assigned some other value.

The simplest form of global thresholding may be binary thresholding. In addition to the source image (src) and threshold value (thresh), the disclosed embodiments take another input parameter called the maximum value (max Value). At each pixel location (x,y), the pixel intensity at that location is compared to the threshold value (thresh). If src (x,y) is greater than or equal to threshold value (thresh), then the thresholding operation sets the value of the destination image pixel, or dst (x,y), to the max Value. Otherwise, dst (x,y) is set to zero (0). Thus, pixels within the blob are at the maximum value or 0.

Thus, the disclosed embodiments may determine which pixels of an image captured of sheet 500 includes a pixel intensity above the threshold. Preferably, this process is used to detect graphics on sheet 500 as the pixels in these areas are above the threshold value. This value relates to the amount of CMYK corresponding to the pixels. As noted above, if using blobs, the blobs should share some characteristic, such as common greyscale or CMYK values.

The disclosed embodiments find portions of the graphics that have colorant values above the threshold. The disclosed embodiments identify portions that span the width and length of sheet 500. The portions do not necessarily need to be from the same graphics. For example, in the length, or vertical, direction, or process direction 502, portion 620 is identified in first graphic 602. Portion 622 is identified in second graphic 604. As can be seen, portion 622 within second graphic 604 may start where portion 620 ends within first graphic 602. Portion 622 may not necessarily extend through all of second graphic 604.

Portion 624 is identified in third graphic 606. Portion 624 may align with portion 622, but includes different parameters, such as different CMYK values. Portion 626 is identified in fourth graphic 608 and also may align with portions 622 and 624. Whenever possible, the disclosed embodiments may try to align portions in the desired direction. Portion 628 is identified in fifth graphic 610. As shown, the different portions 620-628 span the length of sheet 500, even though they are not contiguous. Portions 620-628 may be considered to represent one or more images on sheet 500 in process direction 502.

The same analysis is performed with the width, or cross process direction 504, of sheet 500. Portion 630 is identified in first graphic 602. Portion 632 is identified in second graphic 604. Portion 632 may be aligned with portion 630. Portion 634 is identified in sixth graphic 612. As can be appreciated, portion 634 is not in a graphic with a vertical portion in process direction 502. Portion 636 is identified in seventh graphic 614 and may be aligned with portion 634.

As can be seen, the number of portions in process direction 502 does not necessarily equal those in cross process direction 504. Further, portions 620 and 630 as well as portions 622 and 632 may intersect as they are in first graphic 602 and second graphic 604, respectively. The remaining portions on both directions are not in graphics with other portions. Further, there may be additional graphics on sheet 500 that do not include any portions.

As disclosed above, the disclosed embodiments use portions 620-628 and 630-636 to identify areas on sheet 500 that have sufficient CMYK colorant to be used for defect detection in process direction 502 and cross process direction 504. This analysis may be performed for each page within a print job. Some sheets may not have enough CMYK colorant to span the entire sheet. The graphics and portions may be identified for those areas of the sheet that qualify. There is no requirement that a portion is used for the entire process and cross process directions. The areas for portions 620-628 and 630-636 are stored for each page and passed to the inspection system within printing device 100. Control unit 110 may store the areas in storage unit 28.

The inspection system for printing device 100 includes the CIS sensors disclosed above. No changes are needed for the inspection system within printing device 100 to implement the disclosed embodiments. The sensors disclosed above would scan sheet 500, or all sheets/pages of a print job, as they currently do. The CIS sensor, such as first paper sensor 22 or second paper sensor 23, however, would retain the pixel data for the portions identified above. In other words, the CIS sensor would capture the image data of the identified portions stored in memory. This captured data would cover the entire process direction 502 length and cross process direction 504 width of sheet 500. This action may be performed without having to capture the entire image or images on sheet 500.

The defect detection process would not change but, instead of processing the entire area of sheet 500, the disclosed embodiments process much smaller images, captured within portions 620-628 and portions 630-636. Hardware would not necessarily need to be upgraded to perform these tasks. Existing memory storage on printing device 100 may be used. Further, the disclosed embodiments may use existing sensors. In addition, the defect detection process would receive images for both process and cross process content that would enable cross process defect detection using hardware that is cheaper than typical process detection software. This feature would enable more comprehensive defect detection as opposed to a typical inspection system while at the same time enabling that detection to happen at higher speeds using lower cost hardware.

Figure 7:
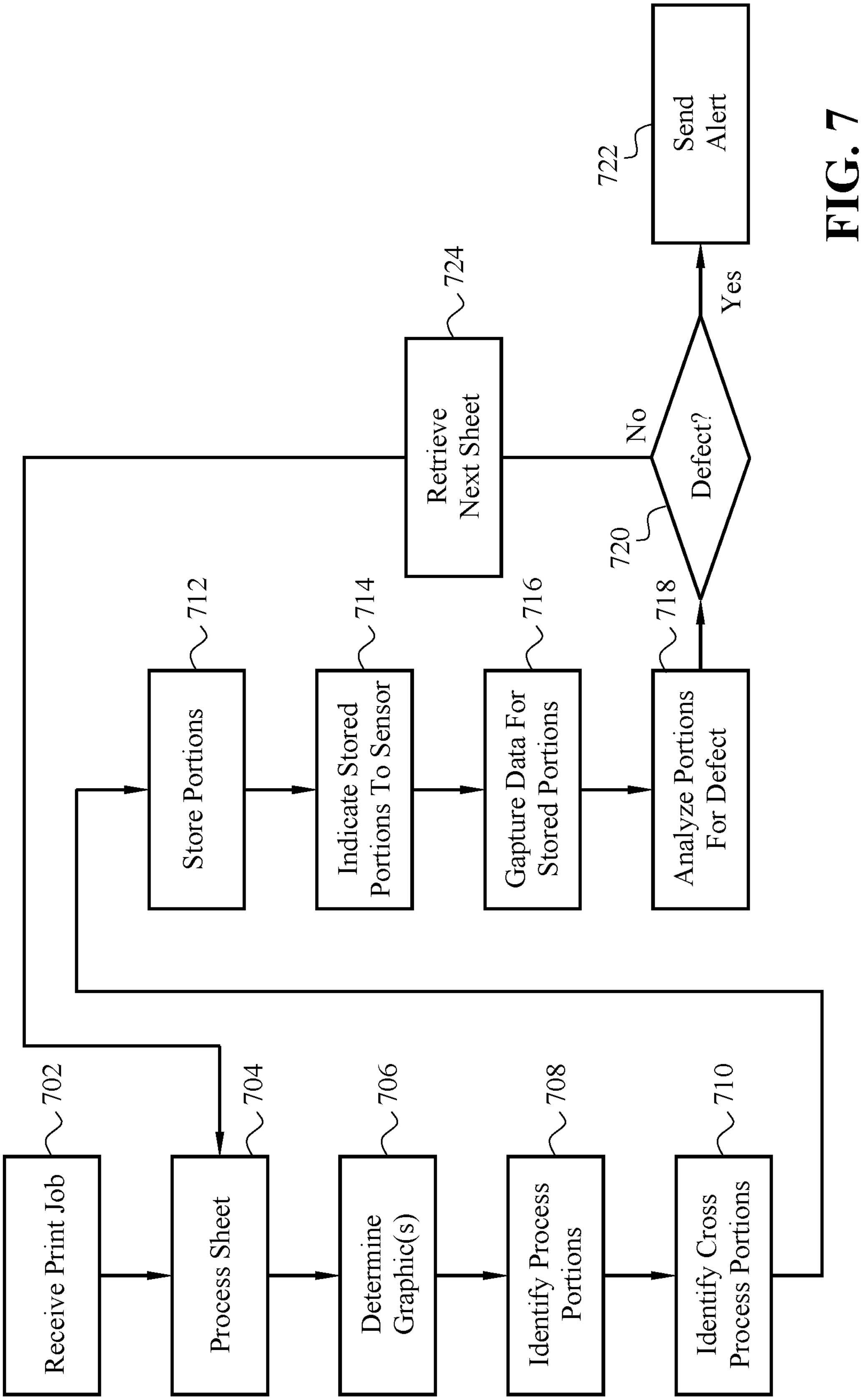
FIG. 7 illustrates a flowchart for performing an inline inspection within the printing device according to the disclosed embodiments.

FIG. 7 depicts a flowchart 700 for performing an inline inspection within printing device 100 according to the disclosed embodiments. Flowchart 700 may refer to FIGS. 1-6 for illustrative purposes. Flowchart 700, however, is not limited to the embodiments disclosed by FIGS. 1-6.

Step 702 executes by receiving a print job at printing device 100. In addition to the processes disclosed in FIGS. 1-4, printing device 100 may determine a number of sheets to be used to print the document of the print job. Step 704 executes by processing one or more sheets of pages for the print job. For example, control unit 110 may render the information on sheet 500 to form an output raster, using raster image processing (RIP). During the RIP processing, the pixels analyzed for the processing also may be used according to the disclosed embodiments.

Step 706 executes by determining graphics from one or more images on sheet 500, as determined during the rendering process. Graphics may be determined using a threshold, as disclosed above. Specifically, the disclosed embodiments may identify areas on sheet 500 that use a certain amount of CMYK colorant that lends itself for detecting problems during reproduction of that area on sheet 500. More than one graphic or image may be on sheet 500, or different graphics may be within a single image.

Step 708 executes by identifying process portions, or vertical portions, in process direction 502. These portions should be within a graphic, such as first graphic 602 to fifth graphic 610, disclosed above. The pixels within each portion should have a common parameter, or have the same CMYK values throughout the portion. This feature allows for consistency in analyzing the portion for defects. In some embodiments, the CMYK colorant amounts may change but the total amount stays above the threshold. The portions, when connected together, preferably extend the length of sheet 500.

Step 710 executes by identifying portions, or horizontal portions, in cross process direction 504. Step 710 may execute similar to step 708 above, except, referring to FIG. 6, the portions may be identified in first graphic 602, second graphic 604, sixth graphic 612, and seventh graphic 614. Thus, the graphics of one or more images on sheet 500 may differ for cross process direction 504 from the graphics or images for process direction 502. Further, these portions, when connected together, preferably extend the width of sheet 500.

Step 712 executes by storing the identified portions in process direction 502 and the identified portions in cross process direction 504, otherwise known as the vertical and horizontal portions, respectively. The disclosed embodiments may use control unit 110 to store the identified portions. The pixel values may be stored for the portions. Step 714 executes by indicating the stored portions, preferably their location on sheet 500, to the sensors of the inspection system of printing device 100. For example, first paper sensor 22 or second paper sensor 23 may be informed of the portions on sheet 500 to capture.

Step 716 executes by capturing the pixel data for the indicated portions on sheet 500. One of the CIS sensors disclosed above may capture images of the horizontal and vertical portions identified above. The sensor may capture an image of sheet 500 after it is printed, preferably by second paper sensor 23. Along with capturing the image for printing operations, the disclosed embodiments may capture the pixel data associated with the portions in process direction 502 and cross process direction 504.

Step 718 may execute by analyzing the captured data for the horizontal and vertical portions for a possible defect. The disclosed embodiments may compare the output pixels of the portions identified above to the data identified during the rendering process. For example, the pixels captured in the identified portions from sheet 500 during the rendering process may be compared to the pixels captured in the identified portions of the printed sheet by second paper sensor 23. The analysis may determine when the pixel values differ by a certain amount to indicate presence of a possible error.

Step 720 executes by determining whether a defect is detected by the analysis. If yes, then step 722 executes by sending an alert to the operator that problems may be occurring in the printing process for the print job. As noted above, a print job may include 1000s or more of sheets being printed. Best to identify any possible problem in the printing process as early as possible but without unduly taxing existing components within printing device 100. If step 720 is no, then step 724 executes by retrieving the next sheet from the print sheet to be processed and analyzed for possible defects. Flowchart 700 returns to step 704. At some point, the print job will run out of sheets and the process will stop.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing an inline inspection during printing operations, the method comprising:
- receiving a printed sheet of a paper media within a printing device;
- determining a plurality of horizontal portions above a colorant value threshold on the printed sheet, wherein the horizontal portions extend in a horizontal direction across the printed sheet;
- identifying a set of the plurality of horizontal portions, wherein the set of horizontal portions span a width of the printed sheet; and
- analyzing the set of horizontal portions to detect a defect within the printed sheet.

2. The method of claim 1, further comprising storing the set of horizontal portions.

3. The method of claim 1, further comprising determining a plurality of vertical portions above the colorant value threshold on the printed sheet, wherein the vertical portions extend in a vertical direction across the printed sheet.

4. The method of claim 1, wherein the printed sheet includes an image.

5. The method of claim 4, wherein the set of horizontal portions include portions of the image.

6. The method of claim 1, further comprising analyzing the set of horizontal portions using an inspection system of the printing device.

7. The method of claim 1, further comprising sending an alert that the defect is detected.

8. An inspection system for a printing device, the inspection system configured to
- receive a printed sheet of a paper media within a printing device;
- determine a plurality of horizontal portions above a colorant value threshold on the printed sheet, wherein the horizontal portions extend in a horizontal direction across the printed sheet;
- identify a set of the plurality of horizontal portions, wherein the set of horizontal portions span a width of the printed sheet;
- determine a plurality of vertical portions above the colorant value threshold on the printed sheet, wherein the vertical portions extend in a vertical direction across the printed sheet;
- identify a set of the plurality of vertical portions, wherein the set of vertical portions span a length of the printed sheet; and
- analyze the set of horizontal portions and the set of vertical portions to detect a defect within the printed sheet.

9. The inspection system of claim 8, further configured to store the set of horizontal portions.

10. The inspection system of claim 8, further configured to store the set of vertical portions.

11. The inspection system of claim 8, wherein the printed sheet includes an image.

12. The inspection system of claim 11, wherein the set of horizontal portions and the set of vertical portions include portions of the image.

13. The inspection system of claim 8, further configured to send an alert that the defect is detected.

14. A method for performing an inline inspection during printing operations, the method comprising:
- receiving a printed sheet of paper media within a printing device;
- determining a plurality of vertical portions above a colorant value threshold on the printed sheet, wherein the vertical portions extend in a vertical direction across the printed sheet;
- identifying a set of the plurality of vertical portions, wherein the set of vertical portions span a length of the printed sheet; and
- analyzing the set of vertical portions to detect a defect within the printed sheet.

15. The method of claim 14, further comprising storing the set of vertical portions.

16. The method of claim 14, wherein the printed sheet includes an image.

17. The method of claim 16, wherein the set of vertical portions includes portions of the image.

18. The method of claim 14, further comprising the set of vertical portions using an inspection system of the printing device.

19. The method of claim 14, further comprising sending an alert that the defect is detected.

20. The method of claim 14, further comprising determining a plurality of horizontal portions above the colorant value threshold on the printed sheet, wherein the horizontal portions extend in a horizontal direction across the printed sheet.

* * * * *